(12) United States Patent
Hu

(10) Patent No.: US 12,495,105 B1
(45) Date of Patent: Dec. 9, 2025

(54) ELECTRONIC DEVICE PROTECTIVE CASE

(71) Applicant: GOLBINBOX INC, Las Vegas, NV (US)

(72) Inventor: Yang Hu, Wuhu (CN)

( * ) Notice: Subject to any disclaimer, the term of this patent is extended or adjusted under 35 U.S.C. 154(b) by 0 days.

(21) Appl. No.: 19/206,159

(22) Filed: May 13, 2025

(51) Int. Cl.
  *H04M 1/02* (2006.01)
  *H02J 50/00* (2016.01)
  *H04M 1/04* (2006.01)

(52) U.S. Cl.
  CPC ......... *H04M 1/0203* (2025.01); *H02J 50/005* (2020.01); *H04M 1/0249* (2013.01); *H04M 1/0279* (2013.01); *H04M 1/04* (2013.01)

(58) Field of Classification Search
  CPC ............. H04M 1/0203; H04M 1/0249; H04M 1/0279; H04M 1/04; H02J 50/005
  See application file for complete search history.

(56) References Cited

U.S. PATENT DOCUMENTS

2023/0299807 A1* 9/2023 Yang .................... A45C 11/002
 455/575.8

FOREIGN PATENT DOCUMENTS

| CN | 207625642 U | 7/2018 |
| CN | 113900528 A | 1/2022 |
| CN | 219124243 U | 6/2023 |

* cited by examiner

*Primary Examiner* — Tuan D Nguyen

(57) ABSTRACT

An electronic device protective case, including a housing provided with an electronic device accommodation chamber, a fixing seat, where the fixing seat is fixedly connected to the housing; and a buckle ring, where the buckle ring is rotatably connected to the fixing seat. When the buckle ring rotates relative to the fixing seat to fit with a surface of the housing, the buckle ring is in a stowed state, and when the buckle ring rotates relative to the fixing seat to unfold from the surface of the housing, the buckle ring is in a supporting state. This electronic device protective case includes the fixing seat disposed on the housing, thereby mounting the rotatable buckle ring. In the stowed state, the buckle ring can achieve a wireless charging function. In the supporting state, the buckle ring can function as a stand.

12 Claims, 16 Drawing Sheets

ELECTRONIC DEVICE PROTECTIVE CASE

TECHNICAL FIELD

The present invention relates to the technical field of electronic device accessories, particularly to an electronic device protective case.

BACKGROUND

With the progress of science and the development of technology, the types of electronic devices have become increasingly diverse, such as mobile phones or tablet computers. The functions of these electronic devices have become increasingly powerful, capable of replacing many tools in people's lives. Thus, electronic devices have gradually become an indispensable tool in people's lives. In the process of using an electronic device, it is typically necessary for the user to hold the electronic device, thereby providing support for it. However, during use, various unexpected situations may arise, making it impossible for the user to hold the device. When dealing with a large and heavy electronic device, prolonged holding by the user leads to gripping fatigue, and thus the user is unable to continue holding. In such case, it becomes necessary to use other tools to support the electronic device.

Typically, the existing support tool is a stand. Specifically, the electronic device is placed on the stand, and the stand provides support for the electronic device. Although a stand can address the issue of support for the electronic device, carrying an additional stand also causes the user inconvenience. Therefore, how to more conveniently support electronic devices is an issue that those skilled in the art need to address.

SUMMARY

Given the above situation, an objective of the present invention is to provide an electronic device protective case that addresses the issue of support for the electronic device by including a rotatable buckle ring on a housing.

The electronic device protective case provided by the present invention includes:
- a housing, provided with an electronic device accommodation chamber;
- a fixing seat, where the fixing seat is fixedly connected to the housing; and
- a buckle ring, where the buckle ring is rotatably connected to the fixing seat, when the buckle ring rotates relative to the fixing seat to fit with a surface of the housing, the buckle ring is in a stowed state, and when the buckle ring rotates relative to the fixing seat to unfold from the surface of the housing, the buckle ring is in a supporting state.

In an embodiment, the buckle ring includes a first end and a second end opposite to each other, the first end is connected to the fixing seat, when the second end fits with the surface of the housing, the buckle ring is in the stowed state, and when the buckle ring rotates relative to the fixing seat and the second end moves away from the housing surface, the buckle ring transitions from the stowed state to the supporting state.

In an embodiment, the case further includes a connector, where the connector includes a first connecting part and a second connecting part rotatably connected to each other. The first connecting part is fixedly connected to the fixing seat, and the second connecting part is fixedly connected to the buckle ring to drive the buckle ring to rotate relative to the fixing seat.

In an embodiment, the connector is a hinge.

In an embodiment, the fixing seat includes a tail pin and a base sheet fixedly connected to each other, and the tail pin and the base sheet are respectively disposed on two sides of the housing to clamp the housing.

In an embodiment, the tail pin is provided with a plurality of limiting protrusions, the base sheet is provided with a plurality of limiting holes, a number and locations of the limiting protrusions correspond to a number and locations of the limiting holes, and the limiting protrusions penetrate through the limiting holes.

In an embodiment, the tail pin is provided with a groove, the housing is provided with a through hole, the tail pin is penetrated through the through hole, and the housing is engaged into the groove.

In an embodiment, the first connecting part is provided with a first connecting hole, the second connecting part is provided with a second connecting hole, the fixing seat is provided with a first connecting protrusion, the first connecting protrusion is fixedly connected to the first connecting hole, the buckle ring is provided with a second connecting protrusion, and the second connecting protrusion is fixedly connected to the second connecting hole.

In an embodiment, the buckle ring further includes a metal ring, and the metal ring is rotatably connected to the fixing seat.

In an embodiment, the buckle ring further includes a (polycarbonate) PC connector and an insulating sheet, a surface of the metal ring facing the housing is provided with an accommodation groove, the PC connector is disposed in the accommodation groove, and the insulating sheet is disposed between the metal ring and the housing and seals the accommodation groove.

In an embodiment, the case further includes a magnetic piece, where the magnetic piece is disposed in the accommodation groove.

In an embodiment, the metal ring is an aluminum ring.

In an embodiment, the housing is further provided with a stowage groove, and the fixing seat and the buckle ring are both stowed in the stowage groove.

In an embodiment, the case further includes an elastic element and a spring cap, where the fixing seat is rotatably connected to the housing, the elastic element is disposed in the tail pin, an inner side of the through hole is provided with a plurality of slots, the spring cap is disposed at an end of the elastic element facing the slots, and the elastic element is configured to drive the spring cap to engage into the slot.

In the electronic device protective case provided by the embodiments of the present invention, the electronic device accommodation chamber of the housing is used to accommodate an electronic device, and the fixing seat is fixedly connected to the housing, where the buckle ring is mounted via the fixing seat. Since the buckle ring is rotatably connected to the fixing seat, and the fixing seat is fixedly connected to the housing, the buckle ring can rotate relative to the fixing seat. When support is needed, the buckle ring rotates in a direction to unfold relative to the housing, providing support through the buckle ring. When support is not needed, the buckle ring rotates to a position fitting with the housing, thereby reducing space occupation and making it more convenient to carry. Moreover, the buckle ring is connected to the fixing seat, and the fixing seat is mounted on the housing, so no additional carrying is required, making the support of the electronic device more convenient and efficient. In addition, the buckle ring can also provide a wireless charging function, improving usage efficiency.

BRIEF DESCRIPTION OF DRAWINGS

To more clearly illustrate the technical solutions of the embodiments of the present invention, a brief introduction to the drawings required in the embodiments is provided below. It should be understood that the following drawings only show certain embodiments of the present invention and therefore should not be regarded as limiting the scope. For those of ordinary skill in the art, other related drawings can be obtained based on these drawings without creative effort.

DETAILED DESCRIPTION OF THE EMBODIMENTS

Figure 1:
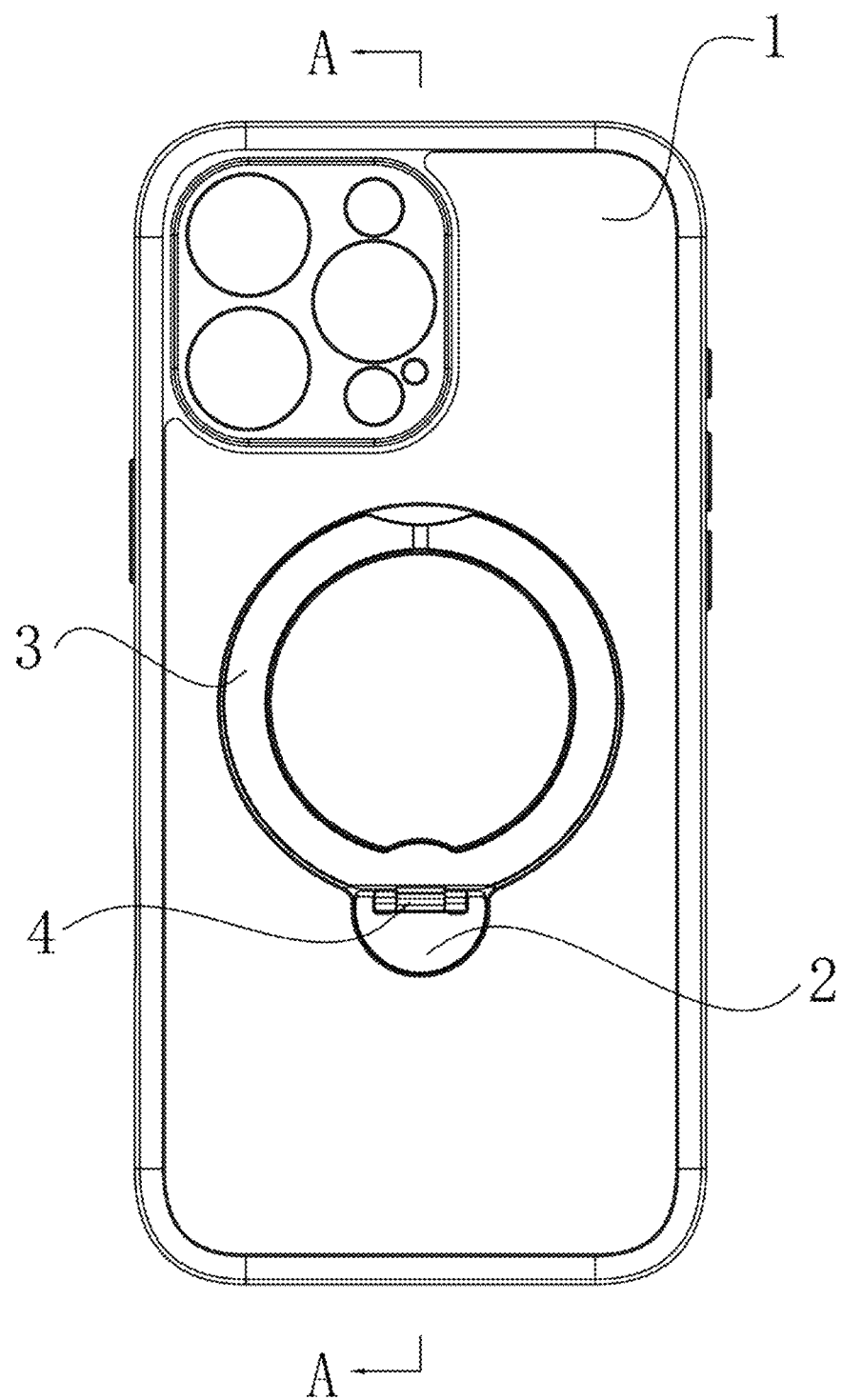
FIG. 1 is a schematic structural diagram of an electronic device protective case according to an embodiment of the present invention.

The specific embodiments of the present invention will be described in detail below with reference to the drawings. Obviously, the described embodiments are only some of the embodiments of the present invention, not all of them. Based on the description of the present invention, all other embodiments obtained by those of ordinary skill in the art without creative effort fall within the scope of protection of the present invention.

In the description of the present invention, unless otherwise explicitly specified or limited, terms such as "dispose," "mount," and "connect" should be understood in a broad sense. For example, it may be a fixed connection, a detachable connection, or an integral connection; it may be a mechanical connection or an electrical connection; or it may be a direct connection or an indirect connection via an intermediary. For those of ordinary skill in the art, the specific meanings of the above terms can be understood based on specific circumstances.

The orientation or positional relationships indicated by terms such as "upper," "lower," "left," "right," "front," "rear," "top," "bottom," "inner," and "outer" are based on the orientation or positional relationships shown in the drawings, or the usual orientation or positional relationships when the invented product is in use, and are only for the convenience of description and simplification, not to indicate or imply that the referred device or element must have a specific orientation, be constructed, and operated in a specific orientation, and thus should not be construed as limiting the present invention.

The terms "first," "second," "third," and the like are merely used to distinguish elements with similar properties and do not indicate or imply relative importance or a specific order.

The terms "include," "comprise," or any other variants thereof are intended to cover non-exclusive inclusion, encompassing not only the listed elements but also other elements not explicitly listed.

Refer to FIGS. 1 to 5, which illustrate an electronic device protective case provided in embodiments of the present invention, including a housing 1, a fixing seat 2, and a buckle ring 3. The housing 1 is provided with an electronic device accommodation chamber 11. The fixing seat 2 is fixedly connected to the housing 1. The buckle ring 3 is rotatably connected to the fixing seat 2, where when the buckle ring 3 rotates relative to the fixing seat 2 to fit with a surface of the housing 1, the buckle ring 3 is in a stowed state; and when the buckle ring 3 rotates relative to the fixing seat 2 to unfold from the surface of the housing 1, the buckle ring 3 is in a supporting state.

Refer to FIGS. 1 to 4. In this embodiment, the housing 1 is exemplified by a phone case, and the corresponding phone model is the iPhone 16 Pro Max. In different embodiments, different models of electronic devices may be used as examples, with no limitation imposed here. The housing 1 is provided with an electronic device accommodation chamber 11, and the size of the electronic device accommodation chamber 11 corresponds to the size of the iPhone 16 Pro Max, such that the iPhone 16 Pro Max fits more closely with the inner wall of the housing 1 after being placed in the electronic device accommodation chamber 11, enabling the housing 1 to provide better protective functionality. Specifically, in different embodiments, the housing 1 may be adaptively adjusted based on the shape of the electronic device, thereby enabling the housing 1 to be adapted to different models of electronic devices, for example, from Samsung or Huawei.

Since the front surface of the housing 1 needs to accommodate the electronic device, the fixing seat 2 is mounted on the back surface of the housing 1. After the fixing seat 2 is mounted, the buckle ring 3 may be mounted on the fixing seat 2. The fixing seat 2 provides a point of force for the buckle ring 3, and since the buckle ring 3 is directly rotatably connected to the fixing seat 2, the buckle ring 3 can rotate relative to the fixing seat 2.

As shown in FIG. 1, during daily use, to avoid the buckle ring 3 occupying excessive spatial volume, the buckle ring 3 typically fits with the back surface of the housing 1. The fitting manner can reduce the space occupation, making carrying more convenient and efficient. Moreover, the buckle ring 3 can also provide a wireless charging function, so the buckle ring 3 needs to fit with the back surface of the housing 1, enabling the buckle ring 3 to face the electronic device in the housing 1 directly, thus achieving wireless charging for the electronic device. In this case, the buckle ring 3 is in a stowed state.

Figure 2:
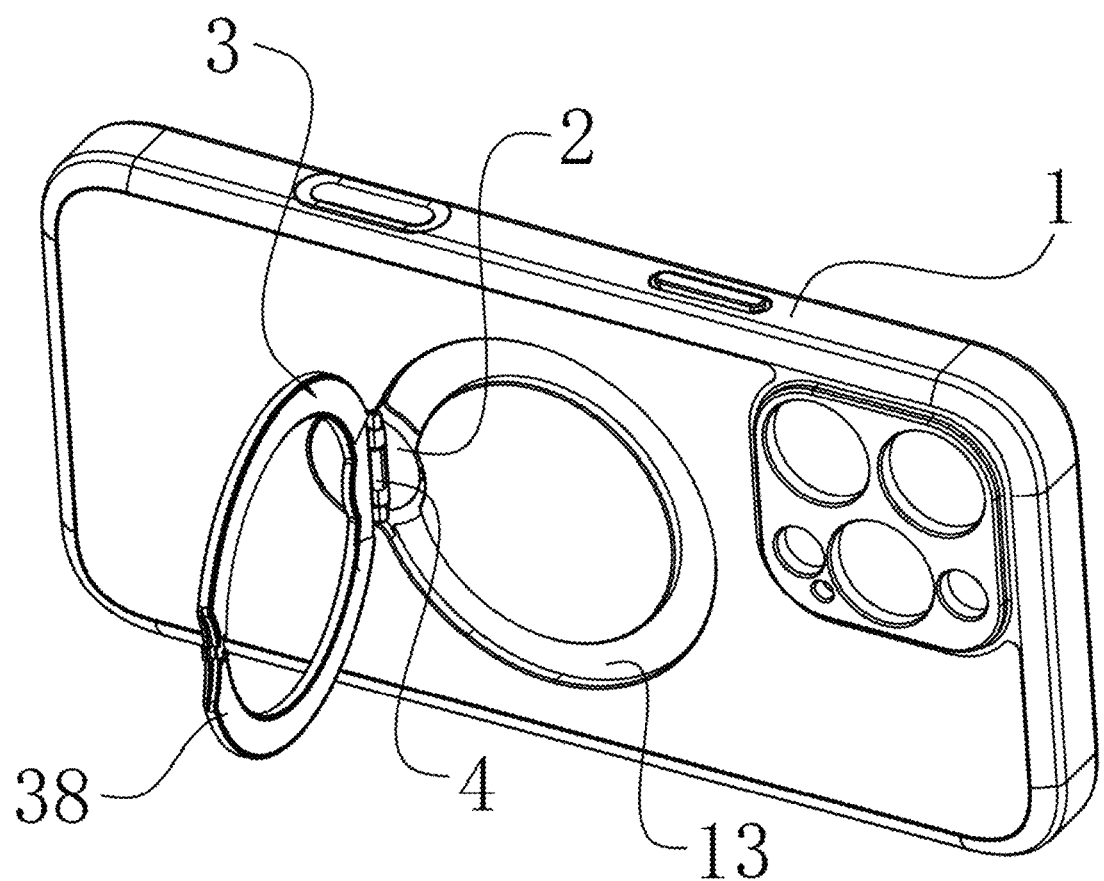
FIG. 2 is a schematic diagram of a buckle ring in the electronic device protective case in a supporting state from a first perspective according to an embodiment of the present invention.
Figure 3:
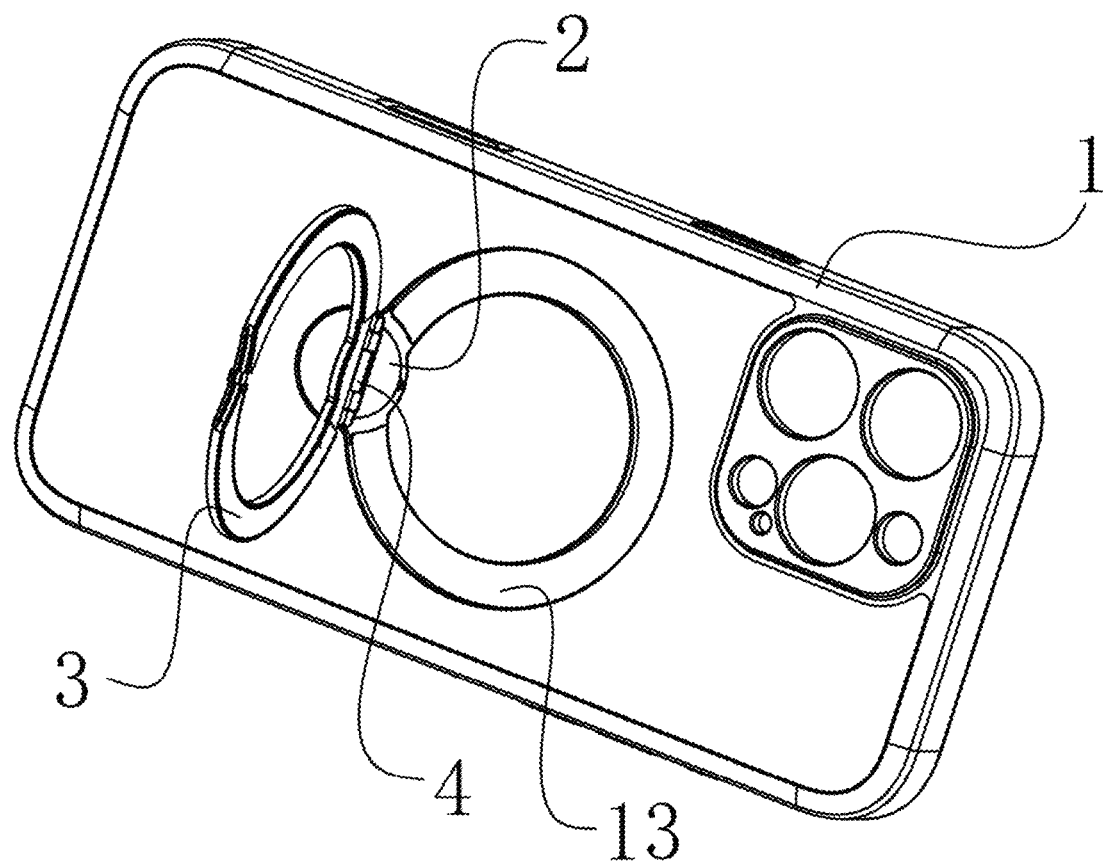
FIG. 3 is a schematic diagram of the buckle ring in the electronic device protective case in the supporting state from a second perspective according to an embodiment of the present invention.
Figure 4:
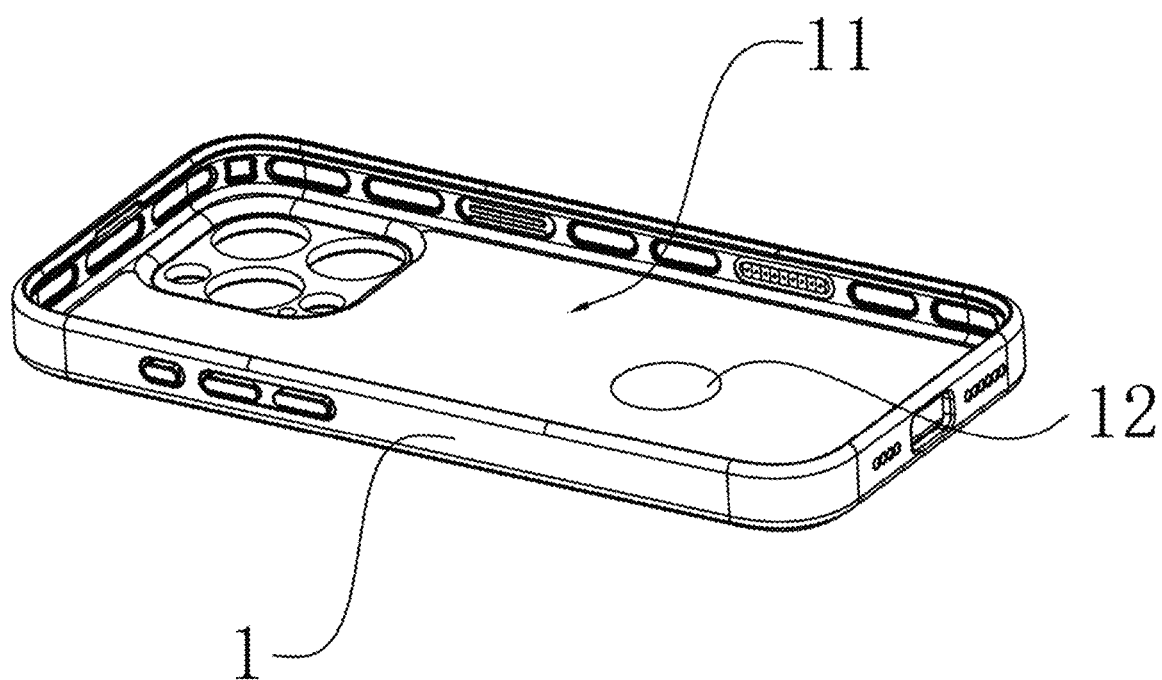
FIG. 4 is a schematic structural diagram of a housing according to an embodiment of the present invention.

Refer to FIGS. 2 and 3. When the electronic device requires support, the buckle ring 3 can rotate to an unfolded state relative to the housing 1, at which point the buckle ring 3 is in a supporting state. Typically, the electronic device is placed on a surface, allowing the surface to support the bottom of the housing 1. Since the buckle ring 3 is located on the back surface of the housing 1, after the buckle ring 3 unfolds relative to the housing 1, the buckle ring 3 can provide support to the back of the housing 1. Thus, stable support can be provided via the buckle ring 3 without the need for additional accessories such as a stand.

In this embodiment, the buckle ring 3 is mounted on the housing 1 via the fixing seat 2. In addition, the fixing seat 2 and the buckle ring 3 are rotatably connected, and as the buckle ring 3 rotates, the buckle ring 3 switches between the stowed state and the supporting state. In the stowed state, the convenience of carrying is improved, and the issue of needing to carry additional tools is addressed. In the supporting state, it can provide a support function for the electronic device, addressing the issue of needing support for the electronic device.

In an embodiment, the buckle ring 3 includes a first end 37 and a second end 38 opposite to each other. The first end 37 is connected to the fixing seat 2, where when the second end 38 fits with the surface of the housing 1, the buckle ring 3 is in a stowed state; and when the buckle ring 3 rotates relative to the fixing seat 2 and the second end 38 moves away from the surface of the housing 1, the buckle ring 3 transitions from the stowed state to the supporting state.

Figure 6:
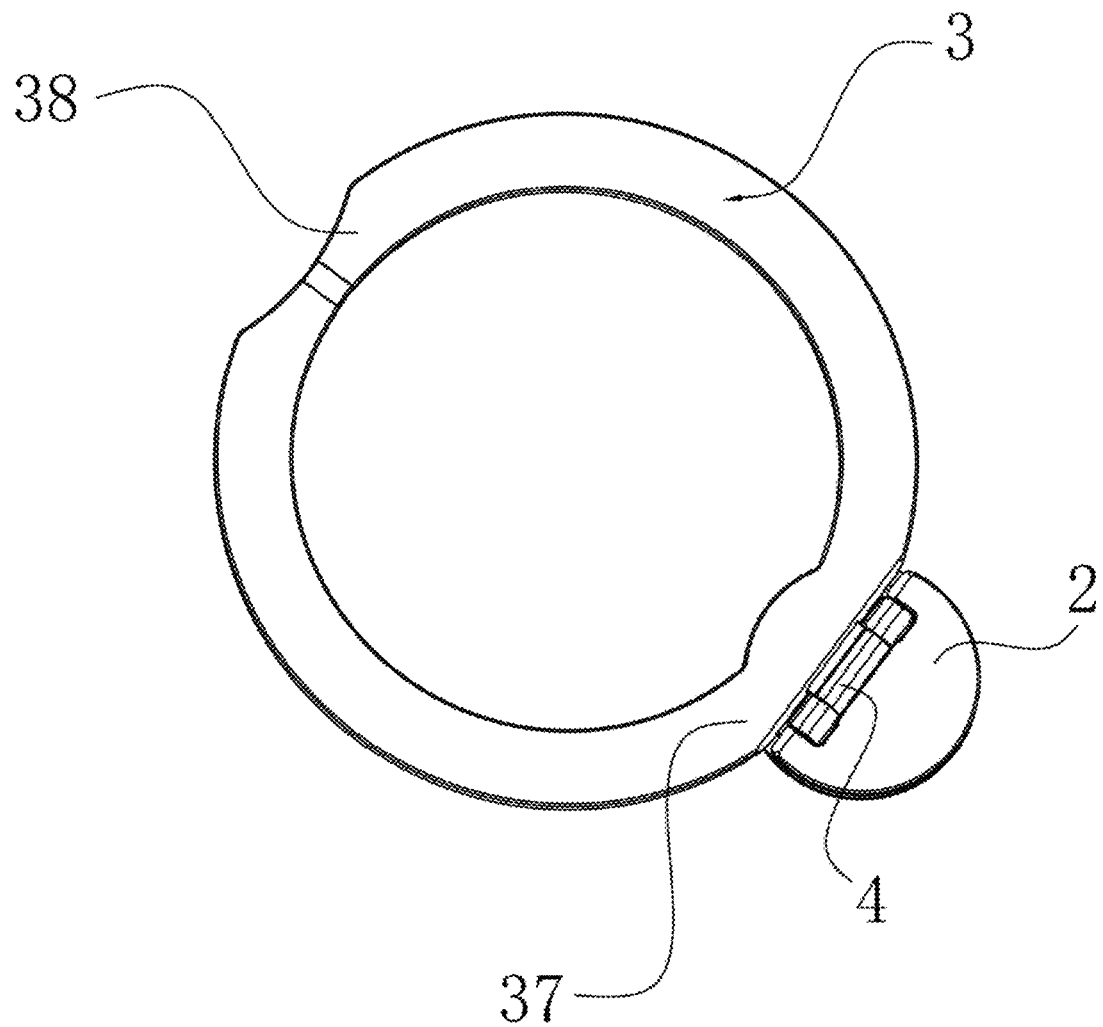
FIG. 6 is a schematic diagram of a fixing seat and a buckle ring being assembled according to an embodiment of the present invention.
Figure 7:
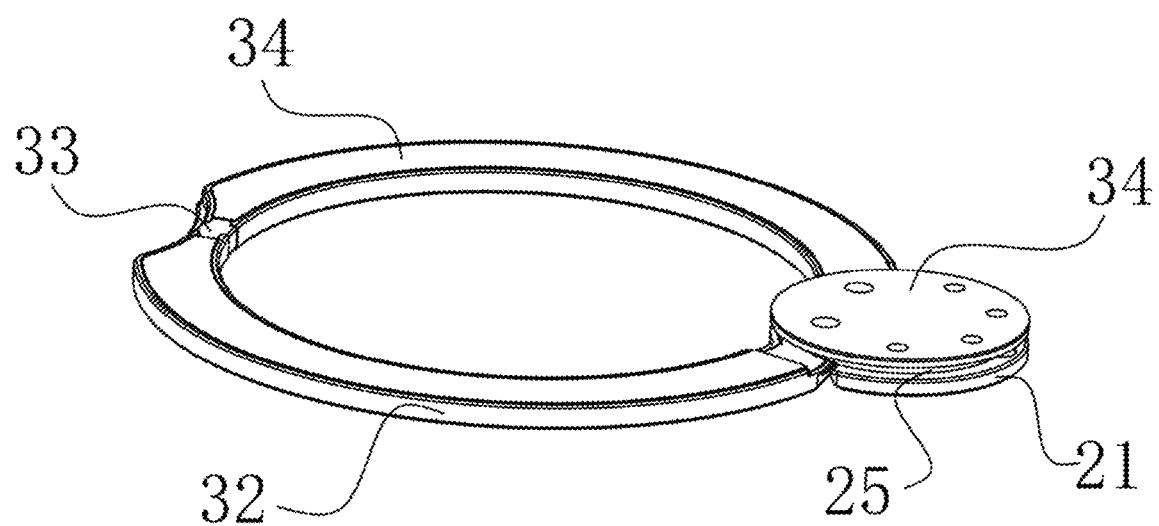
FIG. 7 is a schematic diagram of a bottom of the assembled fixing seat and buckle ring according to an embodiment of the present invention.

Refer to FIGS. 2 and 6. The buckle ring 3 is circular. The first end 37 and the second end 38 are respectively located at the two ends of the same diameter, so on the buckle ring 3, the first end 37 and the second end 38 are the farthest apart. First, the first end 37 is connected to the fixing seat 2. Since the buckle ring 3 and the fixing seat 2 are rotatably connected, after the first end 37 is connected to the fixing seat 2, the unrestricted second end 38 can rotate around the first end 37. Moreover, since the first end 37 and the second end 38 are the farthest apart, when the second end 38 is driven to rotate with the first end 37 as the center of rotation, the lever arm between the first end 37 and the second end 38 is maximized, effectively improving efficiency, increasing torque, and reducing the input of driving force.

As shown in FIG. 1, in this case, the second end 38 fits with the back surface of the housing 1, allowing for a stowed state. When the electronic device needs to be supported, the second end 38 can be driven to move in a direction away from the back surface of the housing 1. As shown in FIG. 2 or FIG. 3, when the second end 38 rotates to a certain distance from the back surface of the housing 1, the buckle ring 3 transitions from the stowed state to the supporting state. In this case, the second end 38 has a sufficient angle for support on a surface, providing support for the electronic device within the housing 1.

In an embodiment, the case further includes a connector 4, where the connector 4 includes a first connecting part 41 and a second connecting part 42 rotatably connected to each other. The first connecting part 41 is fixedly connected to the fixing seat 2, and the second connecting part 42 is fixedly connected to the buckle ring 3 to drive the buckle ring 3 to rotate relative to the fixing seat 2. In an embodiment, the connector 4 is a hinge.

Refer to FIGS. 2 to 10. In this embodiment, the rotational connection between the fixing seat 2 and the buckle ring 3 is achieved via the connector 4. Moreover, the hinge is selected as the connector 4 because a hinge connection is more stable, enabling more stable rotation between the fixing seat 2 and the buckle ring 3.

Figure 10:
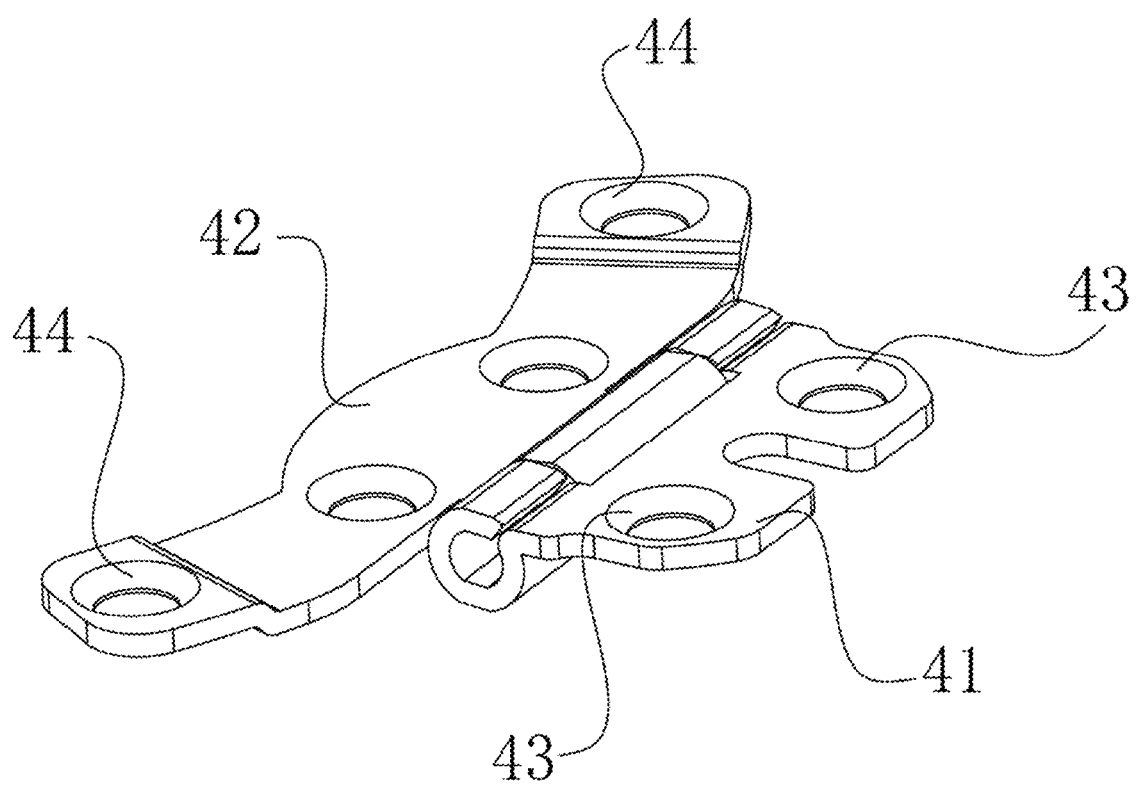
FIG. 10 is a schematic structural diagram of a connector according to an embodiment of the present invention.

As shown in FIG. 10, the connector 4 includes a first connecting part 41 and a second connecting part 42. Since the overall size of the buckle ring 3 is larger than the overall size of the fixing seat 2, the size of the second connecting part 42 is larger than that of the first connecting part 41. The second connecting part 42 has a larger contact area with the buckle ring 3, thereby allowing for a more stable connection of the buckle ring 3 and facilitating the rotation of the buckle ring 3. The fixing seat 2 is fixedly connected to the housing 1, and the first connecting part 41 is then mounted on the fixing seat 2, thereby enabling the rotation of the buckle ring 3 relative to the housing 1. The hinge being selected as the connector 4 allows for more convenient mounting of the buckle ring 3 and smooth, low-friction rotation of the fixing seat 2.

In an embodiment, the fixing seat 2 includes a tail pin 21 and a base sheet 22 fixedly connected to each other, where the tail pin 21 and the base sheet 22 are respectively disposed on two sides of the housing 1 to clamp the housing 1.

Figure 11:
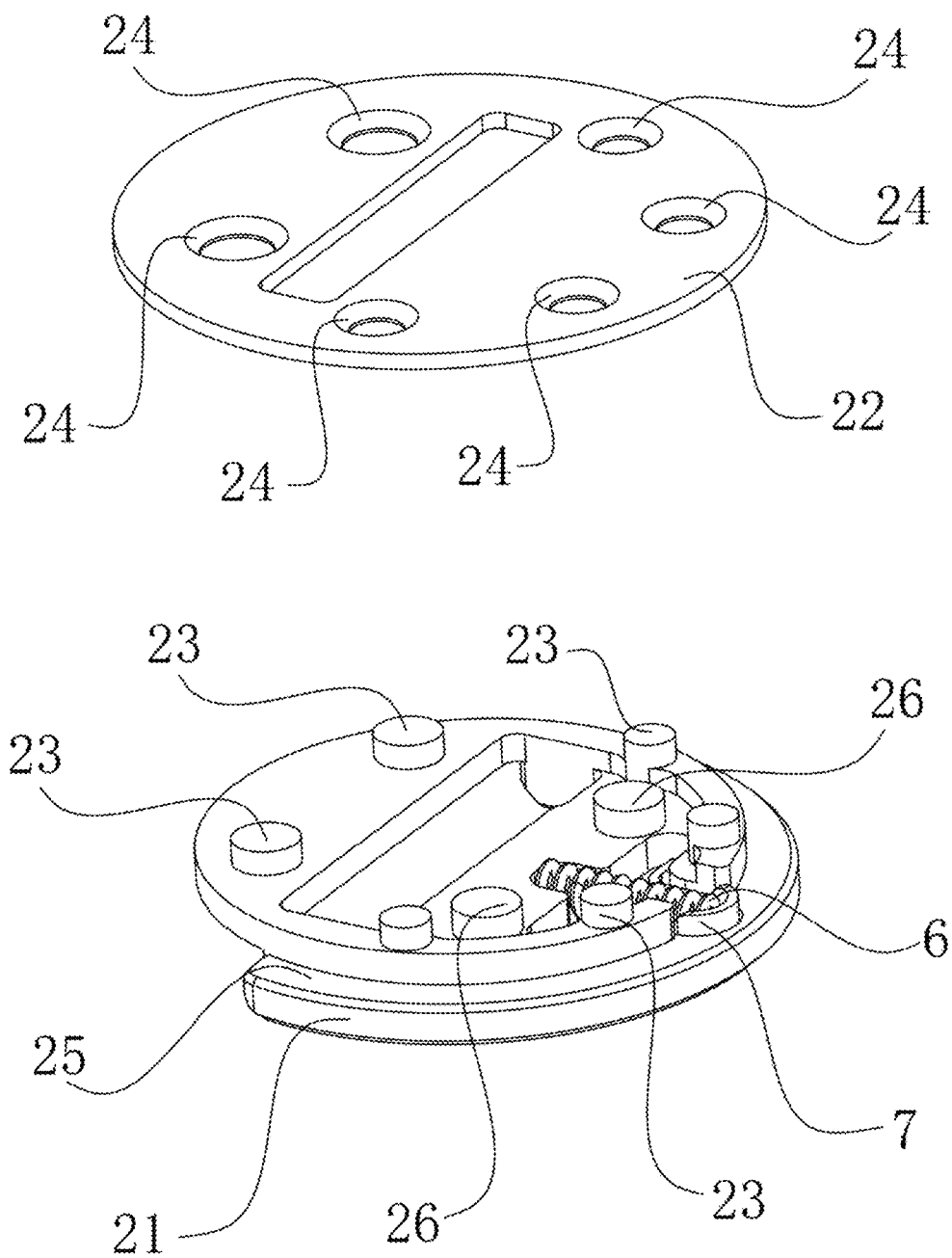
FIG. 11 is an exploded view of the fixing seat according to an embodiment of the present invention.
Figure 12:
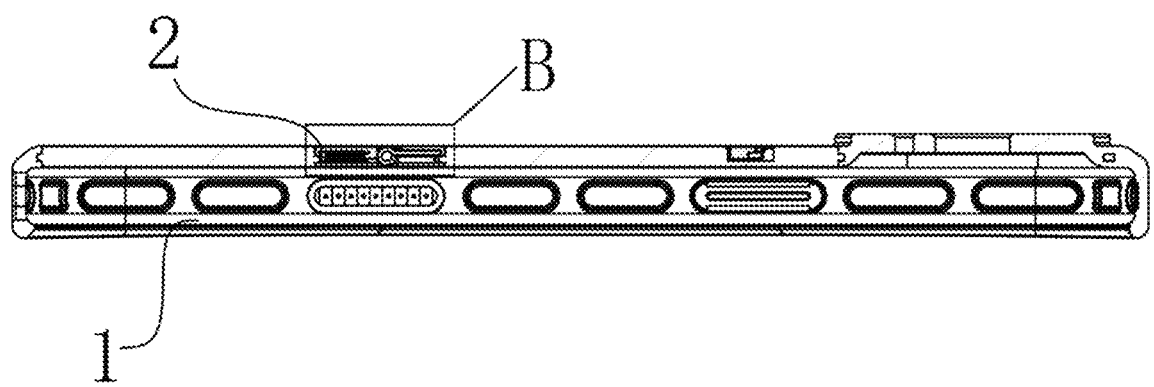
FIG. 12 is a cross-sectional view at A-A in FIG. 1.
Figure 13:
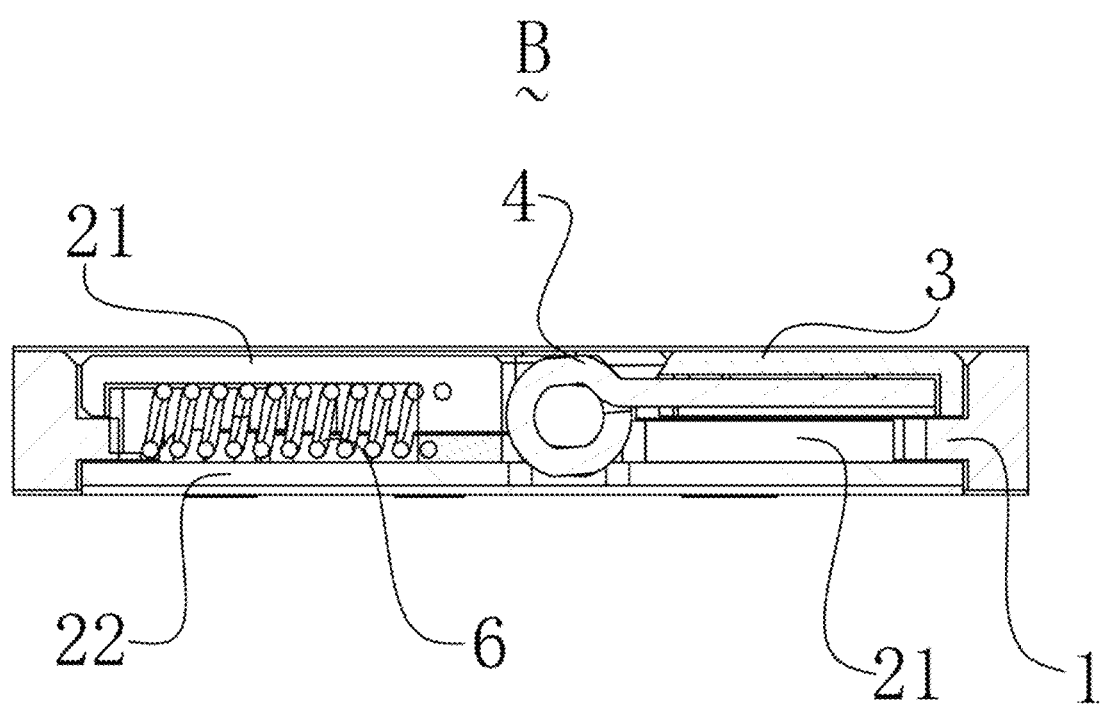
FIG. 13 is an enlarged view at B in FIG. 12.

Refer to FIGS. 11 to 13. In this embodiment, the tail pin 21 and the base sheet 22 are circular, which can improve stability and make the force distribution on the fixing seat 2 more uniform. In addition, the tail pin 21 and the base sheet 22 being circular also offers higher space utilization. The tail pin 21 needs to be connected to the connector 4, so the tail pin 21 is mounted on the back surface of the housing 1. Thus, the base sheet 22 is mounted on the front surface of the housing 1, that is, within the electronic device accommodation chamber 11. In this case, the tail pin 21 and the base sheet 22 are respectively located on both sides of the housing 1, and then the tail pin 21 and the base sheet 22 are fixedly connected to each other, thereby clamping the housing 1 and improving installation stability. Preferably, in this embodiment, the tail pin 21 and the base sheet 22 are connected through press riveting.

In an embodiment, the tail pin 21 is provided with a plurality of limiting protrusions 23, and the base sheet 22 is provided with a plurality of limiting holes 24. The number and locations of the limiting protrusions 23 correspond to the number and locations of the limiting holes 24, and the limiting protrusions 23 penetrate through the limiting holes 24.

As shown in FIG. 11, in this embodiment, six limiting protrusions 23 are taken as an example, and correspondingly, six limiting holes 24 are also provided on the base sheet 22. In different embodiments, the number of the limiting protrusions 23 and the number of the limiting holes 24 may be adjusted as needed, with no limitation imposed here. When the tail pin 21 and the base sheet 22 are connected, it is necessary to align the limiting protrusions 23 with the limiting holes 24, and only then can each limiting protrusion 23 be inserted into the corresponding limiting hole 24. Since the locations of the limiting protrusions 23 and the limiting holes 24 correspond to each other, the limiting protrusions 23 are fixedly connected to the tail pin 21, and the limiting holes 24 are provided on the base sheet 22, the limiting protrusions 23 being aligned with and inserted into the limiting holes 24 can also ensure the accurate relative positional relationship between the tail pin 21 and the base sheet 22.

In this embodiment, the corresponding arrangement of the limiting protrusions 23 and the limiting holes 24 improves the positional accuracy between the tail pin 21 and the base sheet 22.

In an embodiment, the tail pin 21 is provided with a groove 25, the housing 1 is provided with a through hole 11, the tail pin 21 is penetrated through the through hole 11, and the housing 1 is engaged into the groove 25.

Refer to FIGS. 4 to 7. Since the tail pin 21 and the base sheet 22 are respectively located on both sides of the housing 1, clamping the housing 1 during connection, the housing 1 is provided with the through hole 11 to facilitate the connection between the tail pin 21 and the base sheet 22. In this embodiment, the tail pin 21 is provided with a groove 25, so the tail pin 21 passes through the through hole 11 and then connects with the base sheet 22. Since the tail pin 21 is provided with the groove 25, the portion of the housing 1 where the through hole 11 is provided can be inserted into the groove 25, and then the housing 1 is clamped in the groove 25 by the base sheet 22, thereby improving the stability of the connection between the fixing seat 2 and the housing 1.

In an embodiment, the first connecting part 41 is provided with a first connecting hole 43, and the second connecting part 42 is provided with a second connecting hole 44. The fixing seat 2 is provided with a first connecting protrusion 26, and the first connecting protrusion 26 is fixedly connected to the first connecting hole 43. The buckle ring 3 is provided with a second connecting protrusion 31, and the second connecting protrusion 31 is fixedly connected to the second connecting hole 44.

As shown in FIG. 11, the fixing seat 2 is additionally provided with two first connecting protrusions 26. As shown in FIG. 10, the first connecting part 41 is correspondingly provided with two first connecting holes 43. The first connecting protrusions 26 pass through the first connecting holes 43, improving the stability between the fixing seat 2 and the connector 4.

Figure 9:
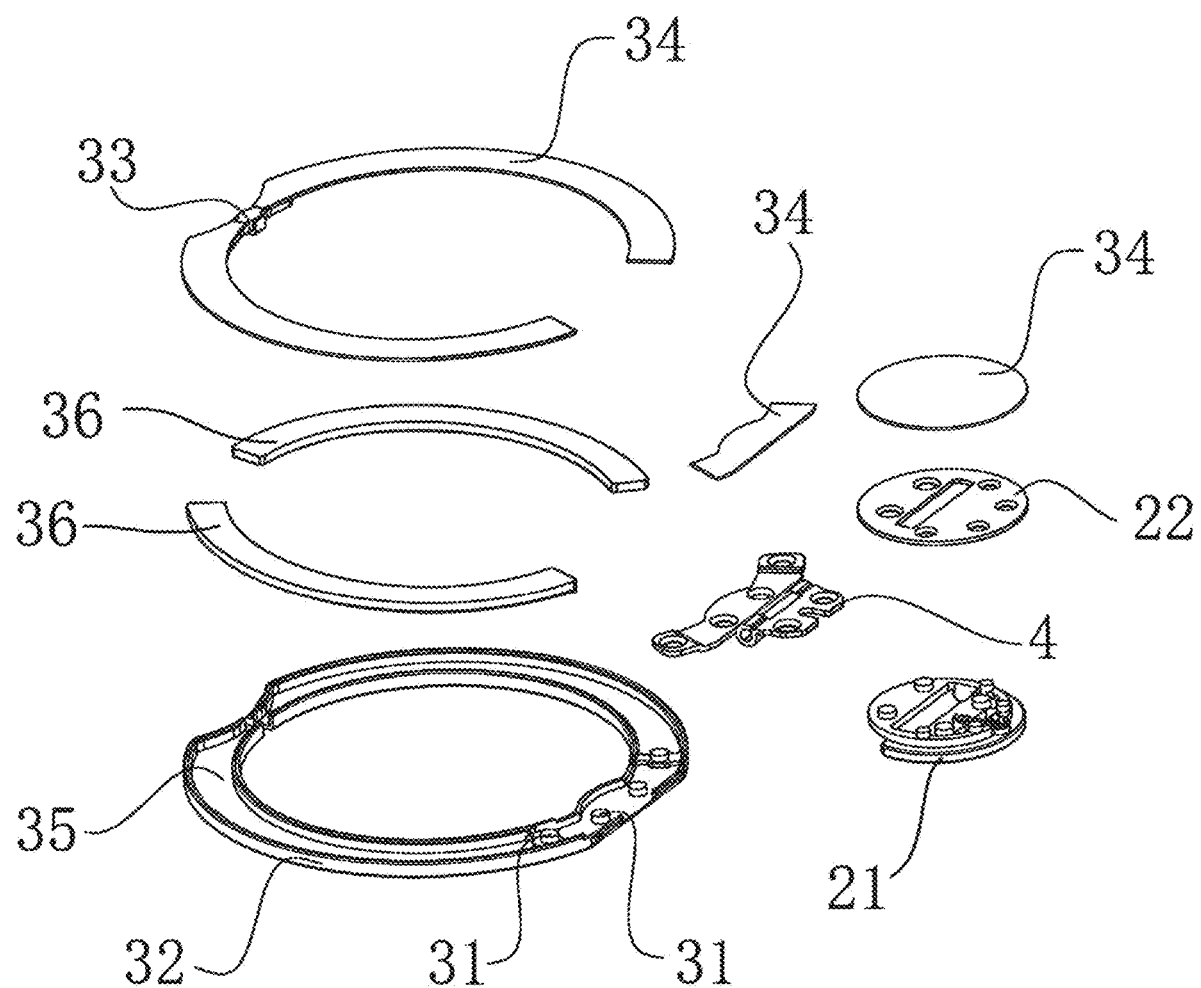
FIG. 9 is an exploded view of flipped FIG. 8.

As shown in FIG. 9, four second connecting protrusions 31 are provided at an end of the buckle ring 3 near the connector 4. As shown in FIG. 10, the second connecting part 42 is correspondingly provided with four second connecting holes 44. Similarly, the second connecting protrusions 31 pass through the second connecting holes 44, improving the stability between the buckle ring 3 and the connector 4.

In an embodiment, the buckle ring 3 further includes a metal ring 32, a PC connector 33, and an insulating sheet 34, where a surface of the metal ring 32 facing the housing 1 is provided with an accommodation groove 35, the PC connector 33 is disposed in the accommodation groove 35, and the insulating sheet 34 is disposed between the metal ring 32 and the housing 1 and seals the accommodation groove 35. In an embodiment, the case further includes a magnetic piece 36, where the magnetic piece 36 is disposed in the accommodation groove 35. In an embodiment, the metal ring 32 is an aluminum ring.

Figure 8:
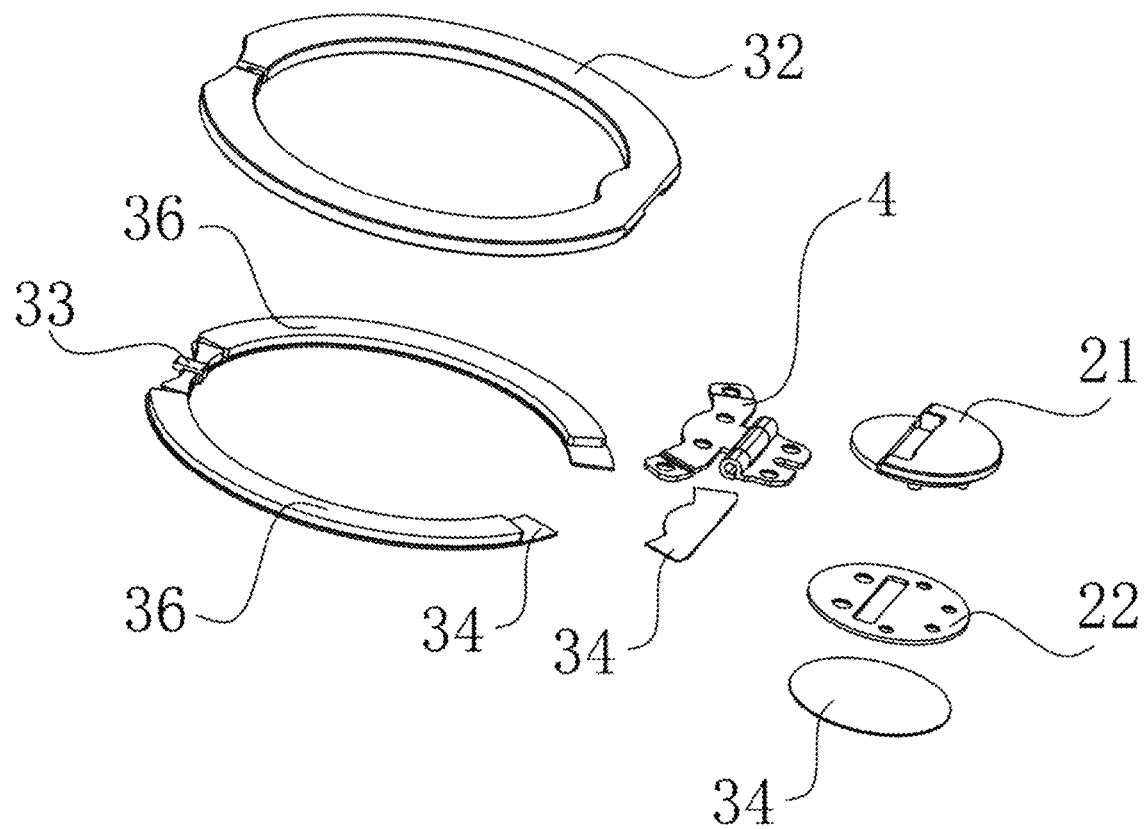
FIG. 8 is an exploded view of the assembled fixing seat and buckle ring according to an embodiment of the present invention.

Refer to FIGS. 8 and 9. In this embodiment, the buckle ring 3 performs energy transfer through the metal ring 32. Preferably, in this embodiment, an aluminum ring is selected as the metal ring 32. Aluminum has a lower density, so selecting an aluminum ring as the metal ring 32 can significantly reduce the overall weight, making it suitable for portable devices and enhancing gripping comfort. Moreover, the aluminum ring has excellent heat dissipation performance, capable of quickly dissipating heat and avoiding high-temperature throttling. In this embodiment, the metal ring 32 is not a complete ring, as the metal ring 32 is disconnected at the ends. Then, the disconnected portion of the metal ring 32 is connected using the PC connector 33, allowing the metal ring 32 to form a complete ring through the PC connector 33. Preferably, a plastic element is selected as the PC connector 33, which can reduce the impact of the metal ring 32 on electromagnetic radiation. Since the PC connector 33 has a certain thickness, a surface of the metal ring 32 facing the housing 1 is provided with an accommodation groove 35 to accommodate the PC connector 33 within the accommodation groove 35.

In addition, a magnetic piece 36 is also disposed in the accommodation groove 35. The magnetic piece 36 not only assists the metal ring 32 in performing wireless charging but also provides a good positioning function and convenient use.

Furthermore, the case also includes an insulating sheet 34, and the insulating sheet 34 is used to seal the accommodation groove 35. Moreover, the housing 1 is in contact with the insulating sheet 34, avoiding direct contact between the metal ring 32 and the housing 1, thus achieving an insulating effect. Preferably, the insulating sheet 34 is a Mylar sheet.

As shown in FIGS. 8 and 9, the insulating sheet 34 is provided on the buckle ring 3, and the insulating sheets 34 are also provided on the connector 4 and the fixing seat 2. Since the connector 4 and the fixing seat 2 are also metal elements, they also require insulation treatment via the insulating sheet 34.

In an embodiment, the housing 1 is further provided with a stowage groove 13, where both the fixing seat 2 and the buckle ring 3 are stowed within the stowage groove 13.

Figure 5:
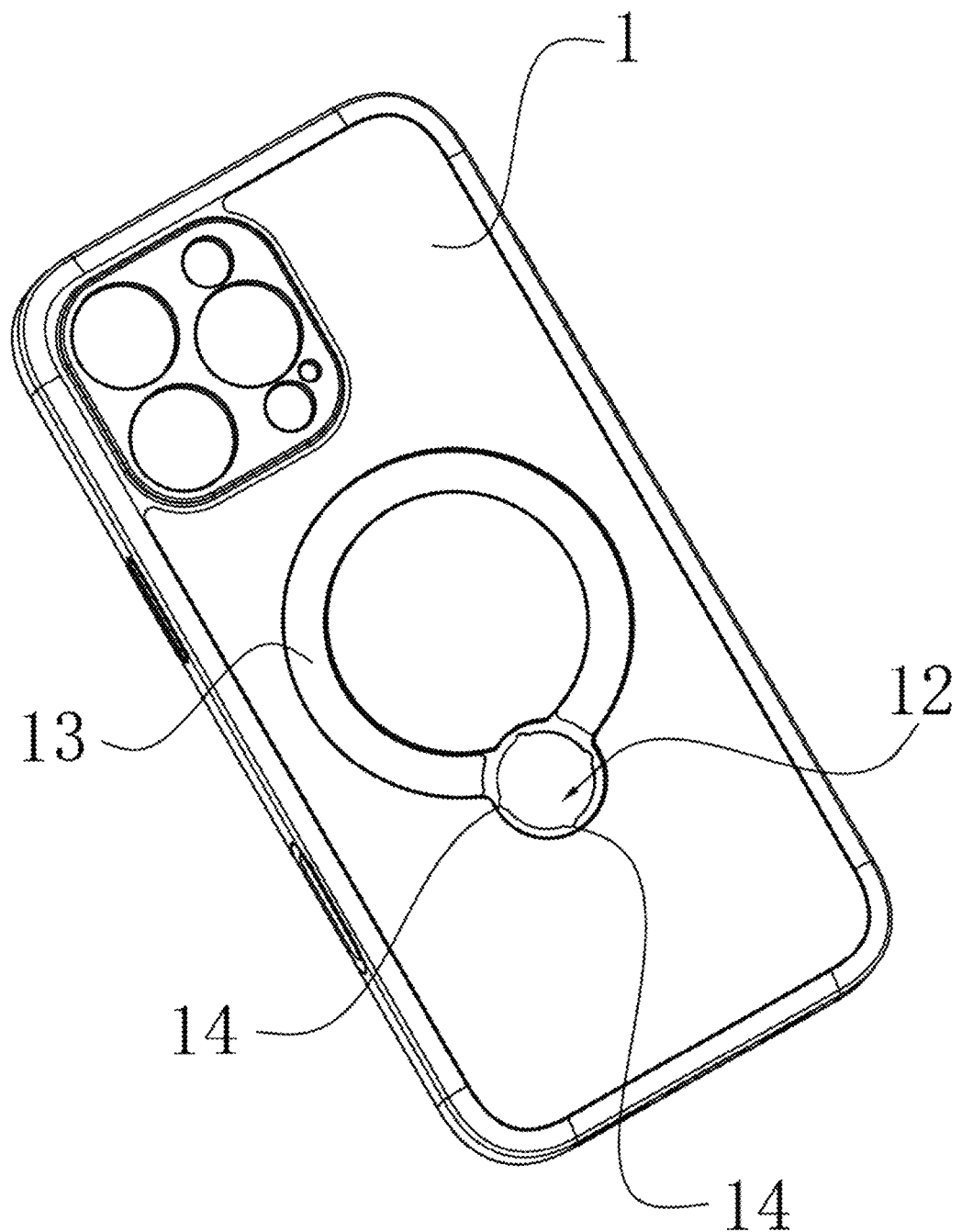
FIG. 5 is a schematic diagram of a back surface of a housing according to an embodiment of the present invention.

As shown in FIG. 5, the stowage groove 13 on the housing 1 is approximately annular, helping to stow the buckle ring 3 in the stowage groove 13. In addition, a portion of the fixing seat 2 is also stowed in the stowage groove 13. When the buckle ring 3 is in the stowed state, the buckle ring 3 can be stowed within the stowage groove 13, thereby fitting with the housing 1. Thus, the buckle ring 3 does not form a protrusion on the back surface of the housing 1, enhancing the overall integrity of the housing 1 and making the housing 1 more convenient to carry.

In an embodiment, the case further includes an elastic element 6 and a spring cap 7, where the fixing seat 2 is rotatably connected to the housing 1, the elastic element 6 is disposed within the tail pin 21, the sidewall of the through hole 12 is provided with a plurality of slots 14, the spring cap 7 is disposed at an end of the elastic element 6 facing the slots 14, and the elastic element 6 is used to drive the spring cap 7 to engage into the slot 14.

Figure 14:
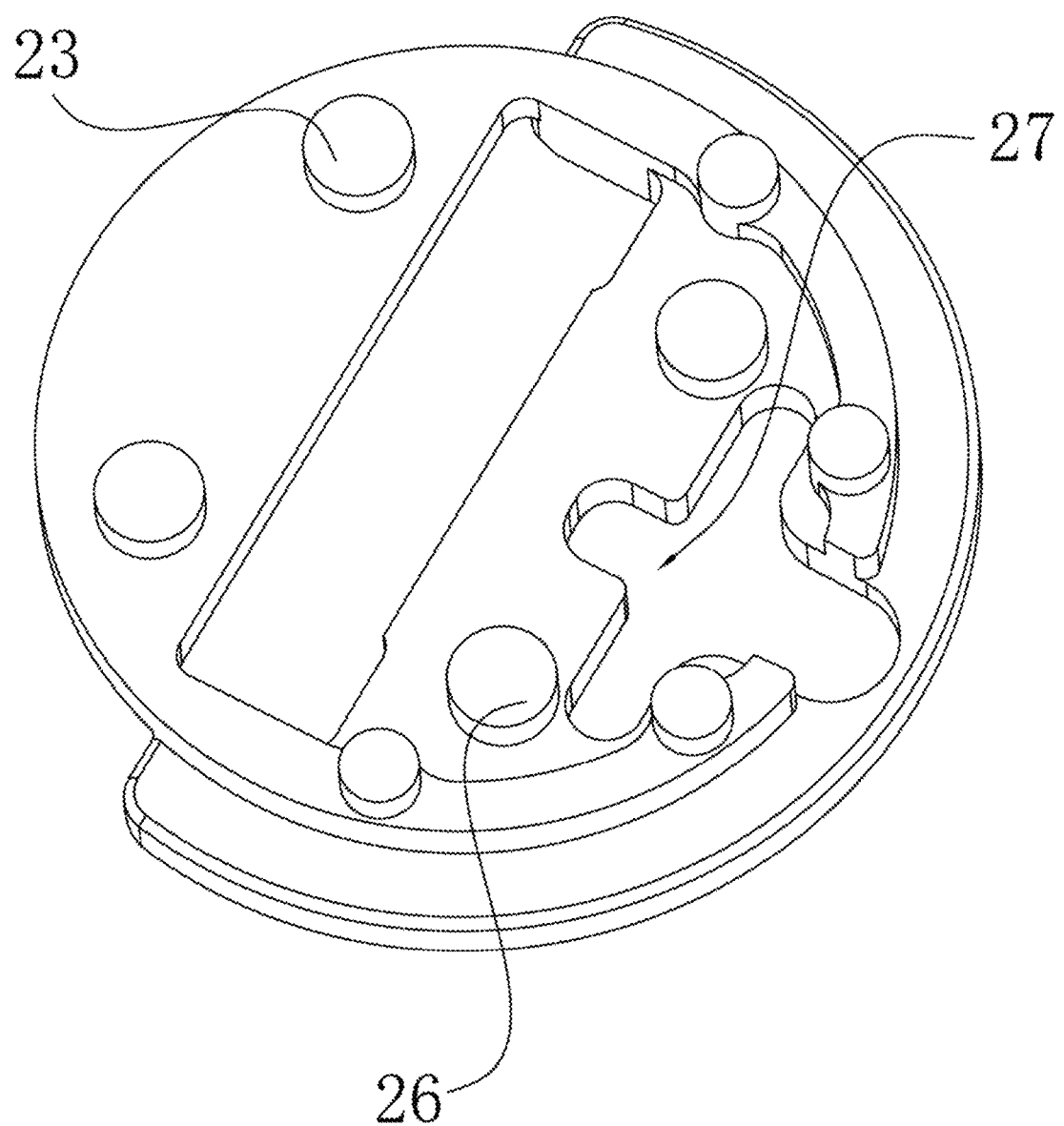
FIG. 14 is a schematic structural diagram of a tail pin according to an embodiment of the present invention.

Refer to FIGS. 11 and 14. The elastic element 6 is provided on the tail pin 21, and the elastic element 6 is preferably a spring. Since the tail pin 21 has a certain thickness, to prevent the elastic element 6 from protruding on the tail pin 21, the tail pin 21 is provided with a spring groove 27 for placing the elastic element 6. As shown in FIG. 11, one end of the spring groove 27 communicates with the groove 25, and the elastic element 6 has elasticity and is capable of pushing outward. Thus, the spring cap 7 is connected to one end of the elastic element 6, and the elastic element 6 pushes the spring cap 7 into the groove 25.

As shown in FIG. 5, the inner side of the through hole 12 is provided with the plurality of slots 14, and in this embodiment, four slots 14 are taken as an example. The fixing seat 2 clamps the housing 1 via the tail pin 21 and the base sheet 22, and the tail pin 21 and the base sheet 22 are connected through press riveting. In addition, the tail pin 21 is provided with the groove 25, and the housing 1 is engaged into the groove 25. Thus, the entire fixing seat 2 can rotate relative to the housing 1. Since the housing 1 is also within the groove 25, when the elastic element 6 pushes the spring cap 7 toward the groove 25, the spring cap 7 is obstructed by the housing 1. In this case, the spring cap 7 abuts against the inner wall of the housing 1, and the spring cap 7 does not engage into the slot 14, so the fixing seat 2 can rotate normally.

Figure 15:
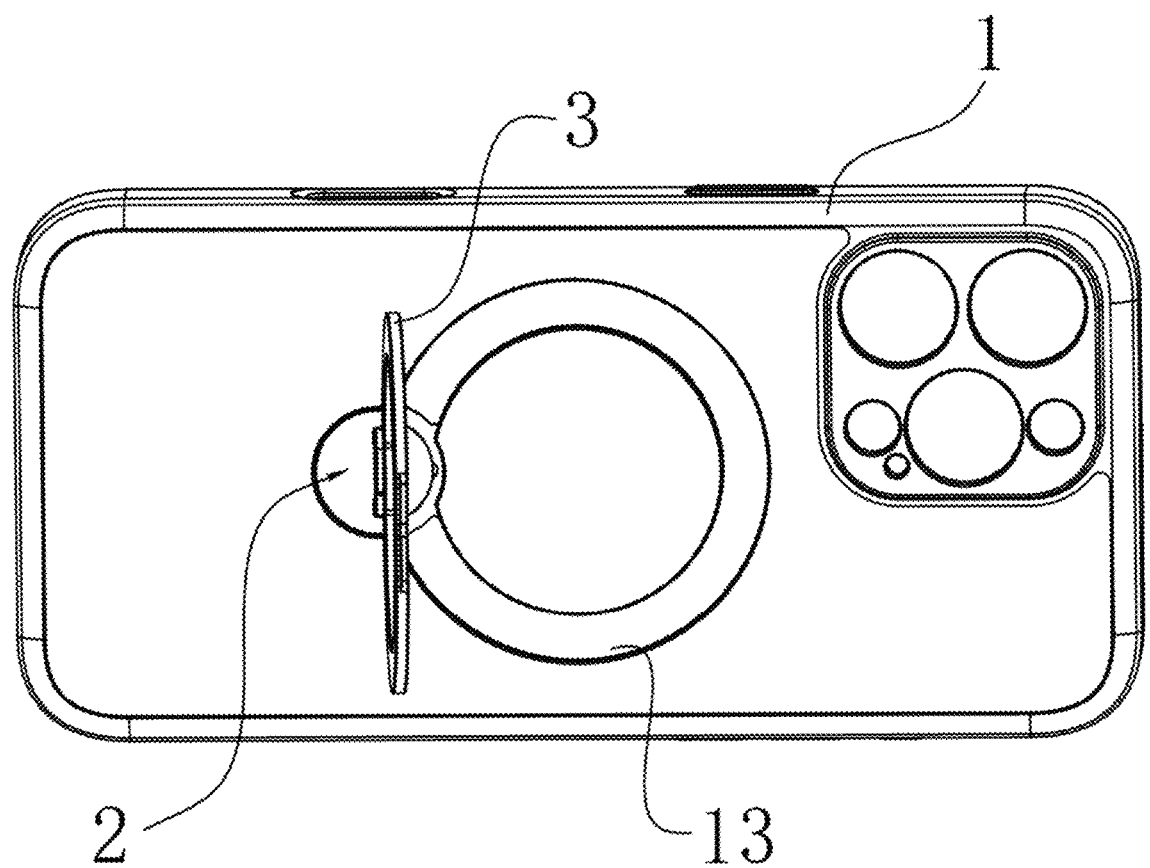
FIG. 15 is a schematic diagram of the buckle ring in the electronic device protective case in a supporting state according to an embodiment of the present invention.
Figure 16:
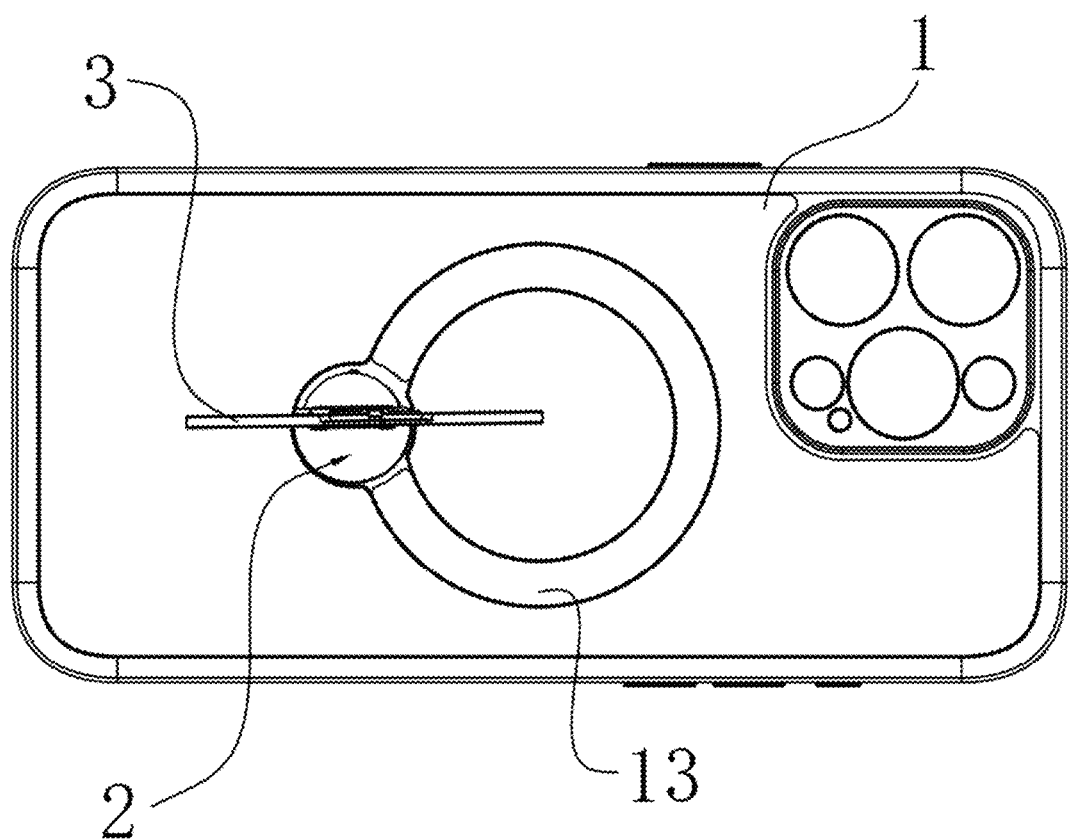
FIG. 16 is a schematic diagram of the buckle ring and fixing seat in FIG. 15 after rotation.

As shown in FIG. 15, when support is needed, the buckle ring 3 first rotates from the stowed state to the supporting state. In this case, the buckle ring 3 unfolds relative to the housing 1. Then, to keep the buckle ring 3 stable in the supporting state, the buckle ring 3 and the fixing seat 2 rotate together. Since the elastic element 6 and the spring cap 7 are disposed within the fixing seat 2, the fixing seat 2 drives the elastic element 6 and the spring cap 7 to rotate together. When the fixing seat 2 drives the elastic element 6 and the spring cap 7 to align with the slot 14 on the housing 1, the spring cap 7, driven by the elastic force of the elastic element 6, is pushed into the slot 14, thereby achieving the engagement of the spring cap 7 into the slot 14. Once the spring cap 7 engages into the slot 14, the stability of the fixing seat 2 and the buckle ring 3 can be maintained, providing a pausing effect.

As shown in FIGS. 11 and 14, the spring cap 7 is "U"-shaped, and as shown in FIG. 5, the slot 14 is also semicircular. Thus, the spring cap 7 engages into the slot 14 via its curved edge, so when the buckle ring 3 needs to be stowed, the fixing seat 2 can be driven to rotate, causing the spring cap 7 to slide out of the slot 14 along the curved edge of the slot 14. Moreover, the elastic element 6 is compressed inward until the next time the spring cap 7 is aligned with the slot 14, at which point the elastic element 6 pushes the spring cap 7 back into the slot 14.

In this embodiment, the slots 14 are provided on the inner side of the through hole 12, and as the fixing seat 2 rotates, the spring cap 7 engages into or slides out of the slot 14 to achieve a gear-stopping effect, making the buckle ring 3 more stable in the supporting state.

The above description is only specific implementations of the present invention, but the scope of protection of the present invention is not limited thereto. Any changes or substitutions that can be easily conceived by those skilled in the art within the technical scope disclosed by the present invention should be covered within the scope of protection of the present invention. Therefore, the scope of protection of the present invention shall be subject to the appended claims.

What is claimed is:

1. An electronic device protective case, comprising:
    a housing, provided with an electronic device accommodation chamber;
    a fixing seat, wherein the fixing seat is fixedly connected to the housing; and
    a buckle ring, wherein the buckle ring is rotatably connected to the fixing seat, when the buckle ring rotates relative to the fixing seat to fit with a surface of the housing, the buckle ring is in a stowed state, and when the buckle ring rotates relative to the fixing seat to unfold from the surface of the housing, the buckle ring is in a supporting state;
    wherein the fixing seat comprises a tail pin and abase sheet fixedly connected to each other, and the tail pin and the base sheet are respectively disposed on two sides of the housing to clamp the housing; and
    wherein the tail pin is provided with a groove, the housing is provided with a through hole, the tail pin is penetrated through the through hole, and the housing is engaged into the groove.

2. The electronic device protective case according to claim 1, wherein the buckle ring comprises a first end and a second end opposite to each other, the first end is connected to the fixing seat, when the second end fits with the surface of the housing, the buckle ring is in the stowed state, and when the buckle ring rotates relative to the fixing seat and the second end moves away from the housing surface, the buckle ring transitions from the stowed state to the supporting state.

3. The electronic device protective case according to claim 1, further comprising a connector, wherein the connector comprises a first connecting part and a second connecting part rotatably connected to each other, the first connecting part is fixedly connected to the fixing seat, and the second connecting part is fixedly connected to the buckle ring to drive the buckle ring to rotate relative to the fixing seat.

4. The electronic device protective case according to claim 3, wherein the connector is a hinge.

5. The electronic device protective case according to claim 3, wherein the first connecting part is provided with a first connecting hole, the second connecting part is provided with a second connecting hole, the fixing seat is provided with a first connecting protrusion, the first connecting protrusion is fixedly connected to the first connecting hole, the buckle ring is provided with a second connecting protrusion, and the second connecting protrusion is fixedly connected to the second connecting hole.

6. The electronic device protective case according to claim 1, wherein the tail pin is provided with a plurality of limiting protrusions, the base sheet is provided with a plurality of limiting holes, a number and locations of the limiting protrusions correspond to a number and locations of the limiting holes, and the limiting protrusions penetrate through the limiting holes.

7. The electronic device protective case according to claim 1, wherein the buckle ring further comprises a metal ring, and the metal ring is rotatably connected to the fixing seat.

8. The electronic device protective case according to claim 7, wherein the buckle ring further comprises a polycarbonate (PC) connector and an insulating sheet, a surface of the metal ring facing the housing is provided with an accommodation groove, the PC connector is disposed in the accommodation groove, and the insulating sheet is disposed between the metal ring and the housing and seals the accommodation groove.

9. The electronic device protective case according to claim 8, further comprising a magnetic piece, wherein the magnetic piece is disposed in the accommodation groove.

10. The electronic device protective case according to claim 8, wherein the metal ring is an aluminum ring.

11. The electronic device protective case according to claim 1, wherein the housing is further provided with a stowage groove, and the fixing seat and the buckle ring are both stowed in the stowage groove.

12. The electronic device protective case according to claim 1, further comprising an elastic element and a spring cap, wherein the fixing seat is rotatably connected to the housing, the elastic element is disposed in the tail pin, an inner side of the through hole is provided with a plurality of slots, the spring cap is disposed at an end of the elastic element facing the slots, and the elastic element is configured to drive the spring cap to engage into the slot.

* * * * *